United States Patent [19]
Glazman et al.

[11] Patent Number: 5,412,701
[45] Date of Patent: May 2, 1995

[54] INTERNAL FUEL ROD COATING COMPRISING METAL SILICATE

[75] Inventors: Jerry S. Glazman, Winsted, Conn.; Mark K. Davis, Springfield, Mass.; Philip A. VanSaun, Tolland, Conn.

[73] Assignee: Combustion Engineering, Inc., Windsor, Conn.

[21] Appl. No.: 997,915

[22] Filed: Dec. 29, 1992

Related U.S. Application Data

[63] Continuation-in-part of Ser. No. 906,380, Jun. 30, 1992.
[51] Int. Cl.$^6$ .................................. G21C 3/00
[52] U.S. Cl. ........................................ 376/419
[58] Field of Search ............... 376/417, 419, 261, 327; 427/235, 203; 252/478; 502/304

[56] References Cited

U.S. PATENT DOCUMENTS

| | | | |
|---|---|---|---|
| 3,925,151 | 12/1975 | Klepfer | 176/68 |
| 4,062,806 | 12/1977 | Roberts | 252/430 |
| 4,365,003 | 12/1982 | Danforth et al. | 428/552 |
| 4,372,817 | 2/1983 | Armijo et al. | 376/417 |
| 4,560,575 | 12/1985 | Eisenstatt et al. | 427/6 |
| 4,566,989 | 1/1986 | Radford et al. | 252/478 |
| 4,582,676 | 4/1986 | Chubb | 376/414 |
| 4,587,088 | 5/1986 | Radford et al. | 376/419 |
| 4,636,404 | 1/1987 | Raffel et al. | 427/53.1 |
| 4,683,114 | 7/1987 | Ho et al. | 376/419 |
| 4,762,675 | 8/1988 | Feild, Jr. | 376/414 |
| 4,824,634 | 4/1989 | Fuhrman et al. | 376/419 |
| 4,880,597 | 11/1989 | Bryan et al. | 376/419 |
| 5,028,382 | 1/1990 | King, Jr. et al. | 376/261 |

OTHER PUBLICATIONS

Frank J. Rahn, Achilles G. Adamantiades, John E. Kenton, Chaim Braun; "A Guide to Nuclear Power Technology", The Electric Power Research Inst.; 1984; pp. 429–438.

Kirk-Othmer, "Encyclopedia of Chemical Technology", Third Edition, vol. 20; 1982; pp. 854–881.

Primary Examiner—Donald P. Walsh
Assistant Examiner—Anthony R. Chi
Attorney, Agent, or Firm—Ronald P. Kananen; John H. Mulholland

[57] ABSTRACT

Coatings for zirconium alloy components of nuclear reactor fuel assemblies are described. The coating consists of a metal silicate binder, particles of burnable-poison particles, such as boron carbide, optional graphite particles and an optional rheology-enhancing component. The coating is deposited from a liquid suspension which also includes a polar solvent.

22 Claims, 1 Drawing Sheet

INTERNAL FUEL ROD COATING COMPRISING METAL SILICATE

This is a continuation-in-part of U.S. Ser. No. 07/906,380, filed Jun. 30, 1992, the entire disclosure of which is herein incorporated by reference.

FIELD OF THE INVENTION

This invention relates to nuclear fuel elements and, in particular, relates to fuel elements with zirconium alloy cladding tubes having a thin, durable, inner layer consisting of burnable-poison particles and an alkali metal silicate binder.

BACKGROUND OF THE INVENTION

In light water reactor (LWR) designs, fuel is typically formed into oxide pellets, which consist of uranium oxide or mixed uranium/plutonium oxide. These pellets are then placed in long tubes called cladding tubes to form fuel rods. The cladding tubes form a barrier against radioactive fission products released in the fuel pellets during irradiation.

Proper fuel design requires an economical fuel cycle, while providing the fuel characteristics necessary for safe plant operation. Thus, structural materials must be selected that have low neutron cross-section and low cost, while providing adequate mechanical corrosion resistance characteristics. Fuel assembly design should accordingly allow for the operation of the reactor at the design power and for the highest possible burn-up without breaching the cladding and releasing radioactive products to the primary coolant.

Zirconium alloys are used in fuel designs because they combine desirable nuclear, physical and mechanical properties. Because nuclear-grade zirconium is expensive, its alloys are used only in the active zone of the nuclear core where its neutron economy is most advantageous. Zircaloy-2 and Zircaloy-4 are two slightly different alloys which were developed for nuclear applications. Zircaloy-2 typically contains about 1.4 wt. % tin, 0.15 wt. % iron, 0.1 wt. % chromium and 0.06 wt. % nickel, 1,000 ppm oxygen and the balance zirconium. Zircaloy-4 typically contains about 1.4 wt. % tin, 0.21 wt. % iron, 0.11 wt. % chromium, 30 ppm nickel, 1,200 ppm oxygen and the balance zirconium. Pressurized water reactor (PWR) fuel rods are typically made with Zircaloy-4 cladding, while boiling water reactor (BWR) fuel rods typically utilize Zircaloy-2.

Continuous operation of a reactor requires that the core remain critical. However, to compensate for the gradual depletion of fissile material with time, as burn-up accumulates, and to compensate for other phenomena such as the buildup of fission products, excess reactivity must be built into the nuclear core. This excess reactivity must be controlled at any given time to keep the reactor critical for steady-state operation. This task is accomplished by the use of materials that are strong neutron absorbers or "poisons." Control elements constructed from neutron absorbers regulate power generation according to demand, provide quick shutdown, account for short-term and long-term reactivity changes that result from temperature changes, and adjust for fission product accumulation and fissile material depletion.

The foremost characteristic of a control material is its neutron absorption properties. These vary with the energy of the impinging neutrons but one can gather together the detailed absorption features into a "thermal absorption cross-section," which is of interest in LWR's. The dominant absorber used in control rods in LWR's is boron.

In addition to the movable control rods used in all LWR's, present LWR designs utilize burnable poisons. These are solid neutron absorbers which are placed in the reactor. As the burnable absorber material is subjected to neutron irradiation, it is gradually depleted. Thus the depletion of the burnable poison corresponds, roughly, to the depletion of fissile material. Burnable-poisons are used to counterbalance excess reactivity at the beginning of the fuel cycle and to provide a means for power shaping and optimum core burn-up. Burnable poison compounds currently of interest include boron, gadolinium and erbium.

For additional general background materials on fuel rods, claddings and absorber materials, see, e.g., Frank J. Rahn et al., *A Guide to Nuclear Power Technology*, (1984).

Many LWR fuel designs employ burnable absorbers in a number of ways. For example, in some designs, burnable absorber rods are placed in fuel assembly lattice locations, thereby displacing fuel rods. Other designs employ burnable absorber rod inserts and fuel assembly guide thimbles. Still other designs involve the formation of burnable-absorber coatings on the inside diameters of cladding tubes, on fuel pellet surfaces, or involve distribution of the burnable absorber within the fuel pellet.

The use of a burnable-poison which is disposed on the inside surface of the fuel cladding tube has several advantages. For example, such a configuration can be used with uranium dioxide fuel pellets provided inside the cladding so that the fuel rod produces as much (or almost as much) power as a regular fuel rod.

Moreover, the burnable-poison can be applied to the cladding tube prior to the introduction of uranium dioxide pellets into the tube, allowing the burnable-poison to be applied to the cladding in a cold (non-nuclear) area. This allows the burnable-poison to be applied by the tubing fabricator or by the fuel-rod fabricator and should reduce the costs associated with the manufacture of the cladding tubes containing the burnable poison.

Furthermore, when the burnable poison is applied to the inside of the fuel cladding tubes, it is relatively easy to adjust the axial gradient of the burnable poison. This provides an advantage over associated methods, which involve putting burnable poison on the pellet and mixing pellet types, by reducing the inventory costs of carrying differing pellet types.

Finally, the use of cladding tubes having a burnable-poison layer provides for improved quality control. For example, the burnable-poison coating depth can be accurately determined by bombarding the tubing with neutrons and measuring the fraction of the neutrons which are not absorbed by the burnable poison.

SUMMARY OF THE INVENTION

It is an object of the present invention to provide a durable burnable-poison coating which provides improved coating integrity through the use of alkali metal silicate binders.

Additional objects, advantages and novel features of the invention are set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a curable burnable poison containing coating is provided for application to a zirconium alloy nuclear fuel assembly component. The curable coating comprises burnable poison particles in an amount effective to provide a predetermined level of neutron absorption; optional graphite particles in an amount effective to impact adequate abrasion resistance to the dried coating; an alkali metal silicate binder in an amount effective to durably bind the burnable poison particles and the optional graphite particles within the coating; an optional rheology-enhancing component in an amount effective to promote application of the uncured coating to the component; and a polar solvent in an amount effective to suspend the burnable poison particles, the optional graphite particles, the alkali metal silicate binder and the rheology-enhancing component. Once cured, the coating provides a durable, cost effective means for introducing a burnable poison into the reactor core.

Moreover, a method of providing a coated zirconium alloy nuclear fuel assembly component comprises drying the above curable burnable poison containing coating (which has been applied to the zirconium alloy component in an uncured state) to a degree sufficient to provide effective mechanical integrity to resist pellet-cladding interaction as well as shocks to the exterior of the cladding.

DETAILED DESCRIPTION

Figure 1:
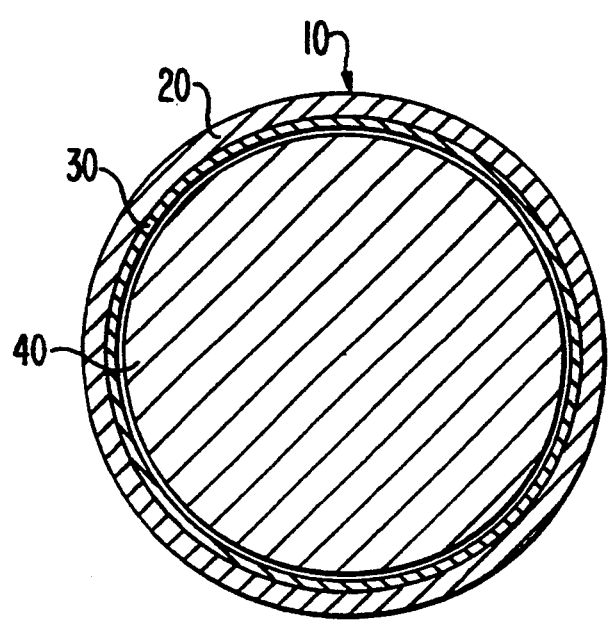
FIG. 1 is a cross-sectional view of a fuel element having a burnable poison coating in accordance with an embodiment of the invention.

The use of zirconium alloy cladding tubes with a thin coating of enriched-boron-containing burnable-poison particles deposited from a liquid suspension which includes an acrylic polymer binder, isopropanol and, optionally, graphite, is discussed in U.S. Pat. No. 4,824,634 to Fuhrman et al., the entire disclosure of which is incorporated herein by reference. The polymeric binder is subsequently burned off during a vacuum curing process.

An advanced coating which also contains burnable poison particles is shown in FIG. 1 wherein the numeral 10 generally indicates a fuel element which is constructed in accordance with an embodiment of the invention for use in a nuclear reactor. The fuel element 10 includes a zirconium alloy cladding tube 20, a cured coating 30 on the inside of the zirconium alloy cladding tube 20, and pellets 40 of a fissionable material such as uranium dioxide ($UO_2$). The cladding tube 20 is preferably made of Zircaloy-2 or Zircaloy-4. The cured coating 30 contains burnable poison particles, one or more alkali metal silicates, and also optionally contains graphite and rheology enhancing components.

Suitable burnable-poison materials include, but are not limited to, fine particle size erbium oxide ($Er_2O_3$), gadolinium oxide ($Gd_2O_3$), titanium borides (TiB/$TiB_2$), zirconium diboride ($ZrB_2$), boron carbide ($B_4C$) and boron nitride (BN), with boron carbide being preferred. The use of boron carbide with its high boron level per unit volume, results in coatings with neutron absorption properties similar to thicker coatings that contain particles with lower boron levels per unit volume. The thickness of the coatings can be further reduced if isotopically purified compounds are utilized. For example, naturally occurring boron includes roughly 20% boron-10 ($B^{10}$) and 80% boron-11 ($B^{11}$). Boron-10, however, has a thermal absorption cross-section that is orders of magnitude greater than that of boron-11. Thus, the use of isotopically purified boron-10 will minimize the thickness of the burnable-poison coating. If minimum thickness is desired, the boron-containing compound will preferably be enriched to at least an 80% level of boron-10. Several methods are available for isotopic separation. For example, Eagle-Picher Industries, Inc., Quapaw, Okla. 74363, produces enriched the boron-10 by fractional distillation. Boron trifluoride ($BF_3$) dimethylether complex is dissociated in a fractional distillation column. Since $B^{11}F_3$ reassociates more readily than $B^{10}F_3$, the boron-11 product concentrates in the vapor phase and the boron-10 product concentrates in the liquid phase. Varying degrees of enrichment of boron-10 can be produced by the Eagle-Picher process. Another method for enriching boron is by atomic vapor laser isotope separation (AVLIS). AVLIS was developed for large scale uranium enrichment applications at the Lawrence Livermore National Laboratory. AVLIS works by first heating and vaporizing a sample of interest, followed by laser irradiation at a wavelength specifically selected to ionize only a selected isotope of interest. Once ionized, the selected isotope is isolated using electric fields. Other typical methods of isotopic separation include gas diffusion, centrifugal separation, and liquid chromatography.

Preferred alkali metal silicates, include sodium silicate, potassium silicate, lithium silicate, and combinations of these metals, which are also known as water soluble silicates. Without being held to any particular theory, it is believed that these silicates react with $CO_2$ in the atmosphere to form a corresponding alkali metal carbonate and a silicic acid. The silicic acid then precipitates to form silica (silicon dioxide), which functions as the pigment binder in the cured coating that is formed.

Solutions of alkali metal silicates can have a considerable range of silica-to-metal oxide mole ratios and are available commercially in a wide range of ratios and concentrations. U.S. Pat. No. 4,062,806 to Roberts, the entire disclosure of which is herein incorporated by reference, indicates that the film-forming ability of alkali metal silicates is better at lower mole ratios of silica-to-alkali metal oxide, whereas water resistance improves with an increase in this ratio.

The choice of the silicate will be determined, in part, by the alkali metal ion which is preferred within the fuel rod. The optimum coating can be produced from a mixture of more than one alkali metal silicates. In the event that mixed alkali metal silicates are utilized, it may be possible to make each fuel batch with a different ratio of the added alkali metal silicates. In the event of leaking fuel, the identity and composition of the metal ions in the reactor coolant could be used to identify the specific batch in which the leaking tube is located. If such an identification is desired, then trace amounts of metal silicates may be added to the fuel rods solely for identification purposes.

Prior to application to the inside surface of a fuel rod cladding tube, one or more of the above-described boron-containing compounds and one or more of the alkali metal silicates are preferably combined in the form of an uncured coating. Solvents that can be used for this purpose include polar solvents such as water and various lower molecular weight alcohols, with water being preferred because it is very cheap and readily available.

Although metal silicates can produce a suitable binder for the burnable poison particles, a simple uncured coating containing alkali metal silicate, burnable poison particles and solvent may not have the proper rheology to be successfully applied in a uniform and consistent manner. Additives may therefore be needed to provide the viscosity, stability, leveling and other characteristics of the uncured coating that are needed in order to optimize application of the uncured coating to the substrate of interest, e.g., the inside of a zirconium fuel rod. Among the additives which may be employed in this function are colloidal silica, natural clays of various origin, cellulose derivatives, graphite, and so forth. While cellulose derivatives are commonly used for viscosity control in uncured coatings, their use in this application will probably require a high-temperature cure under near vacuum conditions or under an inert atmosphere such as helium or nitrogen, since they contain hydrogen, which should be kept to a minimum inside fuel rods.

In addition to being used for its rheological properties in the fluid coating, graphite may also function in the cured coating as a lubricant for the uranium oxide fuel pellets which come into contact with the interior fuel rod wall, reducing the undesirable effects of pellet/cladding interaction.

Variables that affect coating uniformity, coating integrity, coating adhesion, and so forth include the particular make-up of the uncured coating, the particle size, the method of processing the uncured coating and so forth.

As to the particular make-up of the uncured coating, for example, burnable-poison particles, preferably boron carbide, should be present in an amount effective to impact a predetermined level of neutron absorption. Graphite can optionally be provided in an amount effective to provide adequate abrasion resistance to the resulting dried coating. Alkali metal silicate should be provided in an amount effective to durably bind the burnable poison particles and the optional graphite particles within the coating. An optional rheology-enhancing component may be added to adjust the rheology of the uncured coating to promote application to the substrate of choice. Finally, a polar solvent, preferably water, is added in an amount effective to disperse the above additives to the proper extent.

More specifically, for each 100 parts alkali metal silicate: preferably about 25 to about 80 parts, more preferably about 30 to 50 parts boron carbide (with a naturally occurring distribution of boron isotopes) are added; preferably up to about 10 parts, more preferably about 4 to 8 parts graphite are added; preferably up to 5 parts, more preferably about 0.5 to 2 parts rheology-enhancing components are added; and preferably about 20 to 70 parts, more preferably about 25 to 50 parts water are added.

In mixing the various components of the uncured coating, it is preferable to provide an uncured coating that is as uniformly mixed and as free of particle aggregates as possible. For this purpose, a mixing apparatus having moving impellers designed to enhance abrasion resistance (e.g., by use of diamond or boron carbide coated blades) or another suitable mixing apparatus (such as a ball mill having boron-carbine balls) is preferred.

The burnable poison particles and the optional graphite particles, preferably range from about 0.25 to about 50 $\mu$m, and more preferably about 1 to about 10 $\mu$m. The more preferred range reflects a balance between the need for smaller particles to provide coating uniformity and the need for larger particles to avoid particle aggregation difficulties. However, particle aggregation difficulties may also be addressed, for example, by gradually sifting the particles through a sieve of appropriate mesh size into the uncured coating during mixing or by using high-shear mixing apparatus.

After application to the inside surface of the cladding tube, the final cured coating should contain a density of burnable poison particles appropriate for the particular application at hand. For example, a content of about 3 milligrams of boron-10 per inch of 0.382" i.d. Zircaloy tubing, or about 0.016 grams of boron carbide per square inch, was assumed for purposes of the present invention.

The specific uncured coating composition selected should be amenable to deposition on the inside surface of a 12 to 14 foot long Zircaloy tube having an approximate inner diameter of 0.4". Preferred application methods include: (1) a "pig" or plug method wherein a self-centering plug having a diameter that is slightly smaller than that of the inside diameter of the tube is drawn through the tube, pushing excess coating ahead and leaving an even layer of coating behind; (2) a centrifugal method wherein a bead of coating is whirled into place within a spinning, lathe-mounted tube to form a uniform bubble-free coating; (3) a conventional spraying method; and (4) a drain method like that described in U.S. Pat. No. 4,824,634 to Fuhrman et al. The "pig" and centrifugal methods are more preferred because they are expected to provide superior coating uniformity and minimal equipment wear.

Since the uncured coating of the present invention contains minimal organic or hydrogen contamination, the deposited solution can be cured by drying at room temperature and under ambient conditions, preferably for about 1 to 3 days. Nevertheless, if residual hydrogen contamination presents a problem due, for example, to bicarbonate contamination, unreacted SiOH, or residual organic compounds, curing at elevated temperatures, with an inert atmosphere or vacuum, may be desirable. For example, according to an embodiment of the invention, the coated cladding tube may be degassed at room temperature under a vacuum of $10^{-4}$ to $10^{-6}$ torr for two hours minimum. The coating then be cured by heating the coated cladding tube to a maximum of about 432° C. (810° F.) at a heating rate of about 12° C. (10° F.) per minute while maintaining a vacuum better than about $10^{-3}$ torr. The coated cladding tube may then be held at a temperature of about 421° C. (790° F.) for up to about 24 hours while maintaining a vacuum of about $10^{-4}$ to $10^{-6}$ torr, followed by cooling to about ambient temperature under the $10^{-4}$ to $10^{-6}$ torr vacuum. Other less rigorous, elevated temperature curing schemes are readily apparent. For example, according to U.S. Pat. No. 4,365,003 to Danforth et al., curing of inorganic silicates may take place at temperatures on the order of 300° F. to about 500° F. and, in general, on the order of 150° F. to 1,000° F. Thus, any temperature within these elevated ranges may be selected based on the properties of the resulting coating, but the temperature should not exceed 800° F. to avoid degradation of the zirconium alloy properties. If elevated temperatures or vacuum conditions are used, care should be taken not to drive off the residual solvent too rapidly, since this may produce microscopic holes and craters in the coatings. For this reason, the coating is preferably initially outgassed at room temperature and then heated slowly to the final cure temperature. Alternatively, if there is residual hydrogen in the coating from unreacted SiOH, treatment with a CaOH solution may be used to neutralize and remove the hydrogen in lieu of heat/vacuum treatment.

The following examples illustrate the invention. All parts and percentages in this specification and claims are by weight unless otherwise indicated.

EXAMPLES

The following ingredients were used in the examples:

Boron. ART boron carbide (1–2$\mu$ particles) was used as the source of boron. Boron carbide is approximately 20% boron-10 and 80% boron-11.

Binder Systems. Three types of monovalent (potassium and lithium) metal silicates were used: PQ Kasil #1—Potassium Silicate, 20.9% $SiO_2$, 8.28% $K_2O$, balance $H_2O$; FMC (FMC Corporation, Lithium Division, 449 North Cox Road, Box 3925, Gastonia, N.C. 28054) Lithsil 4—Lithium Silicate, 20.7% $SiO_2$, 2.2% $Li_2O$, balance $H_2O$; and FMC Lithsil 6—Lithium Silicate, 18.8% $SiO_2$, 1.6% $Li_2O$, balance $H_2O$.

Coating Additives. Deionized water was used as a diluting agent for controlling final coating viscosity/thickness; Whittaker (Whittaker, Clark & Daniels, Inc., Technical Services Department, 1000 Coolidge Street, South Plainfield, N.J. 07080-1000) Min-U-Gel 400 is a 400 mesh attapulgite filler that is needle shaped for solution thickening and coating reinforcement; Rheox (Rheox, Inc., P.O. Box 700, Hightstown, N.J. 08520) Bentone MA is a hectorite thickener which forms gels and suspends solids in aqueous systems; Cummings Moore M850 Graphite is a 4–5$\mu$ thickening agent which reduces surface friction. Sulfur analysis, 683 ppm; and Graphite Products LS-2306 Graphite is a spectrographic grade graphite with an average particle size of 5–6$\mu$. It has a maximum of 600 ppm sulfur.

Metal Substrates. Preliminary coating formulations were cast onto ~12 mil aluminum. Promising formulations were later cast onto ~20 mil Zircaloy-4.

Substrate preparation products. 3M Scotch-Brite green abrasive pad; and Eco-Klene alkaline detergent product (Economics laboratory Inc., St. Paul, Minn.).

The uncured coatings were prepared according to either an ultrasonic/hand stirred procedure or a Waring Blender procedure.

An ultrasonic/hand stirring technique was used in several of the coating formulations in order to utilize minimum quantities of $B_4C$ and to disperse the boron carbide particles into the binder solution. A pre-dispersion of water, rheological agent, and graphite were blended in a Waring blender until a smooth uniform dispersion was obtained, free of visible particle clumps. This process generally averaged 1 minute of blending time on high speed, while occasionally scraping the sides of the blender to ensure a uniform mix. Once the dispersion was processed, it was added to a mixture of boron carbide and metal silicate solution and blended in an ultrasonic bath with a spatula until a uniform consistency was reached. The ultrasonic bath increased the thixotropy of the solution and helped to disperse the boron carbide throughout the uncured coating; however, the ultrasonic bath failed to break up some of the large particle aggregates.

Alternatively, the boron carbide was dispersed using a Waring blender in order to eliminate the large clumps of boron carbide that were present in the ultrasonic dispersed uncured coatings. The boron carbide, graphite, silicate and water were blended in the Waring Blender for approximately one minute. The sides of the blender were periodically scraped down so that any particles remaining on the sides of the jar could be dispersed throughout the solution. Once a uniform solution without large particle clumps was obtained, the rheological agent was added, and the mixture was blended for an additional 30 seconds. The solution generally thickened during the blender dispersion technique. Overall, the Waring blender produced smooth clump-free uncured coatings.

It is imperative for the substrate to be free of grease or other contaminants in order for the waterborne uncured coatings to uniformly wet the substrate. Accordingly, all substrates coated were first prepared by the following procedure: The substrate was sanded lightly using a 3M Scotch-Brite green abrasive pad. The sanded substrate was washed in a 2% solution of Eco-Klene in deionized water. The washed substrate was then rinsed in deionized water and allowed to air dry.

Films were applied over a range of 2.5 to 7.5 mil wet thicknesses in order to obtain the approximate 1.5 mil thickness necessary for achieving the suggested concentration of about 16 mg boron carbide per square inch. After drying, it was determined that the films had approximately half of their theoretical density. This discrepancy in the coating density was believed due, in part, to air that was whipped into the uncured coating during dispersion of the coating ingredients in the Waring blender. (Note that the Waring blender was used in both the Ultrasonic/hand-stirred and the Waring blender Methods for preparing the uncured coating.)

The following testing procedure were used to evaluate the silicate coatings.

Preliminary Examination: If the coating mud-cracked and/or peeled on drying, it was reformulated or abandoned.

Fingernail Test: The coating was air dried for 48 hours prior to conducting this test. A fingernail was used to scratch the edge of the coating. If the coating could be scratched off so that the substrate was exposed, the coating failed the test.

Crock Meter Abrasion Test: A textile "Crock Meter" was fitted with an $Al_2O_3$ pellet with an approximate 0.375" diameter. The crock meter was cycled 50 passes across the surface of the coating at an effective loading of 18 psi. The test was evaluated by visual inspection of the abraded area. The coating failed the test if it was abraded down to the substrate.

Tape Peel (Crosshatch Method): A razor-knife was used to score the coating in a crosshatch pattern. The loose coating was brushed from the surface, and a piece of tape was pressed over the crosshatched area. The tape was then pulled from the surface of the coating, and the amount of coating removed was noted. The coating was rated "good" if none of the coating was removed by the tape, "fair" if a little of the coating pulled away from the crosshatched area, and "poor" if the coating was removed over much of the crosshatched area. Graphite which has floated to the surface during coating and drying can interfere with this test.

Reverse Impact: The reverse impact test was conducted using a Gardner Drop Dart Impact Tester. The sample was positioned, coating side down, in the tester, and the dart was dropped from heights of 2 inches and 6 inches. The coating was then rubbed lightly to remove any loose coating. An evaluation of the coating's performance was made by visual inspection of the amount of coating remaining at the location of impact. The test was rated "good" if approximately 0 to 20 percent of the coating was removed, "fair" if approximately 20–50 percent of the coating was removed, and "poor" if 50–100 percent of the coating was removed.

The formulations identified as Examples 1 to 12 in Table 1 were evaluated for their physical properties. The results of the fingernail, Crock Meter, tape peel, and reverse impact testing are shown on Table 2 and are discussed below. As can be seen from Table 2, four of the better performing formulations are Example 4, Example 10, Example 11 and Example 12. The following tentative conclusions were drawn from the above Example 1 to 12.

The FMC Lithsil-4 lithium silicate (high lithium) appeared to result in a more mechanically durable coating than the FMC Lithsil-6 (Tables 1 and 2, Example 1 vs. Example 3). This observation is consistent with that of U.S. Pat. No. 4,062,806, wherein film-forming ability is enhanced by lower mole ratios of silica to alkali metal oxide. While both coatings had adequate adhesion to survive the $Al_2O_3$ Crock meter test, the quality of the Lithsil-6 coating appeared to be lower than that of the Lithsil-4 coating based on visual quality and the tape peel adhesion test. The Lithsil-6 coating had a high concentration of tiny pinholes and poor tape peel adhesion across the bulk of its surface area, while the Lithsil-4 had significantly fewer visible pinholes and excellent resistance to the tape peel adhesion test. Thus, silicates with a high lithium content may produce better films than silicates with a low lithium content.

Generally, both lithium and potassium silicate could be used to produce sufficient coatings (Example 4 [Li], Example 11 [K], and Example 12 [Li]). The differences between the potassium and lithium binders were subtle, but were easier to identify with a qualitative comparison of the two coatings with respect to set time, cure on glass, and adhesion after water immersion. The PQ Kasil #1 coatings appeared to have most of their adhesive strength and coating integrity immediately upon drying. This was in contrast to the lithium-based coatings which did not appear to reach their full adhesive potential for 48 hours. When cast on a glass slide, the lithium silicate-based coatings cured with an abundance of pinholes, while the potassium-based coatings appeared to be virtually pinhole free. The lithium silicate appeared to be less tolerant of boron carbide clumping than the potassium silicate. In areas with large boron carbide aggregates, the lithium silicate tended to microcrack, whereas the potassium silicate did not. The lithium silicate also appeared to be more susceptible to mud-cracking than the potassium silicate. Both the lithium and the potassium silicate binders appeared to suffer a loss in adhesion (fingernail test) after immersion for 24 hours in water. The more preferred overall ratio of metal silicate binder of about 35:106 to about 50:100 appeared, for the most part, to be suitable. Neither the boron carbide nor the graphite were easily rubbed out of the binder. Less binder appears to be feasible. This would allow an increase in boron-10 without increasing the thickness of the coating. However, a reduction to one-half of the more preferred ratio may be too severe. For example, when the ratio of boron carbide+graphite+rheology-enhancing agent to silicate was decreased to about 90:100, the lithium silicate coating (Example 8) failed the fingernail test and the reverse impact test. It should be noted, however, that this formulation still provided sufficient adhesion to pass the Crock Meter and the Tape Peel tests. Formulations having a ratio lower than the more preferred range are less desirable because thicker coatings are required to provide the required concentration of boron carbide per square inch. Excessively thick coatings are undesirable, since they reduce the clearance inside the Zircaloy tube and are more susceptible to mud-cracking.

Graphite appears to be an important ingredient in the silicate formulations. First, graphite was found to improve the abrasion resistance of the silicate coatings. Example 7, without graphite, had poor abrasion resistance during the 50-cycle $Al_2O_3$ Crock Meter test and the coating was completely removed down to the substrate. The coating with less than the more preferred graphite content (Example 9) was not abraded as severely as the coating without graphite and passed the Crock Meter test, but 50 cycles with the $Al_2O_3$ Crock Meter abraded away a considerable amount of coating. Coatings that contained the more preferred graphite-to-alkali metal silicate ratio abraded only slightly during Crock testing.

One possible drawback to formulating the coatings with graphite is the potential for "fluffy" coatings. It is possible that the graphite helps to hold air in the uncured coating as it is dispersed. These air bubbles tend to decrease the density of the dry coating, since they help to keep the structure porous as the film dries down. Entrainment of tiny air bubbles (apparently by the graphite) may cause some pinhole problems. Air bubbles, however, may be removed by vibration, centrifugation, vacuum, and so forth.

The dispersion of the pigment appears to be important to the function of the coating. The Waring-blender-dispersed coatings appeared to perform better than their ultrasonic/hand-stirred counterparts. This was not surprising, as most of the problems associated with the hand-stirred coatings occurred in areas with large boron carbide clumps. In extreme cases of poor pigment dispersion, the silicate films develop micro-cracking around the large particle agglomerates. This microcracking apparently leaves areas with high concentrations of particle clumps that are more susceptible to damage by reverse impact or tape peel adhesion. There may be significant differences between the potassium and the lithium silicates in terms of handling poor pigment dispersion. For example, the potassium silicate appeared to have much better performance than the lithium silicate coatings in areas of poor dispersion.

Ammonia was added to Examples 2, 4, 7 and 8 in order to improve the overall coating characteristics and the adhesion of the dry film. At the onset, the ammonia improved the doctorability of the uncured coating, thereby creating improved wet-out of the substrate and smoother dry coatings. Additionally, the ammonia appeared to improve the fingernail resistance of partially cured coatings, possibly improving the adhesion of the fully cured coating. Later in the investigation, however, it became apparent that ammonia actually was detrimental to the performance of the coating. Example 2 had much poorer physical properties after one week at room temperature and/or 1 hour exposure to 160° F. than its non-ammonia counterparts Example 1.

The thixotropy of the uncured coating may be important depending on the method used to apply uncured coating to the inside of the Zircaloy cladding tubes. Needle-shaped attapulgite and plate-shaped hectorite thickening agents were employed as rheology-enhancing components in effort to promote suspension of the boron carbide particles, in addition to coating reinforcement. In practice, the plate shaped hectorite was much more efficient than the needle-shaped attapulgite in thickening the uncured coating. The hectorite was therefore preferred since it could be used at lower concentration to achieve the same net result. The benefit of either of these fillers appeared to be minimal in providing reinforcement to the coating, however. This was perhaps more a result of their low concentration rather than their lack of function, however. The thixotropy of the uncured coating did not appear to be related to the physical properties of the coating beyond its effect on the dispersion of the boron carbide. If the uncured coating was too thixotropic during dispersion of the filler, it was more difficult to break up the boron carbide clumps. The order of addition therefore, affected the blender dispersion methods, since it was difficult to achieve a vortex in the blender if the solution was a thick gel. Ultimately, the thixotropy of the solution will be based, for example, on the extent that the fillers settle out of the solution, and on what method is to be used to apply the coating to the Zircaloy surface. Although the more preferred ratio was about 0.5 to about 2 parts rheology-enhancing components per 100 parts alkali metal silicate binder, the exact degree of thixotropy will depend, for example, on these considerations.

Features, advantages and other specific embodiments of this invention will become readily apparent to those exercising ordinary skill in the art after reading the foregoing specification. In this regard, while specific embodiments of this invention have been described in considerable detail, variations and modifications of these embodiments can be effected without departing from the spirit and scope of the invention as disclosed and claimed.

TABLE 2
Physical Properties of Candidate Coatings

| | Fingernail | Crock Meter | Tape Peel | Reverse Impact 2" lb/6" lb |
|---|---|---|---|---|
| Ex. 1 | pass | pass | good-fair | good/good |
| Ex. 2 | pass | pass | good-fair | good/fair |
| Ex. 3 | fail | pass | fair | fair/poor |
| Ex. 4 | pass | pass | good | good/good |
| Ex. 5 | pass | pass | fair | good/good |
| Ex. 6 | pass | pass | good | good/fair |
| Ex. 7 | pass | fail | good | good/fair |
| Ex. 8 | fail | pass | good | fair/poor |
| Ex. 9 | pass | pass | good | poor/poor |
| Ex. 10 | pass | pass | good | fair/fair |
| Ex. 11 | pass | pass | good | good/good |
| Ex. 12 | pass | pass | good | good/good |

We claim:

1. A coated zirconium alloy nuclear fuel assembly comprising a zirconium alloy nuclear fuel assembly component in combination with a coating comprising:
   burnable poison particles in an amount effective to provide a predetermined level of neutron absorption;
   optional graphite particles in an amount effective to provide abrasion resistance to said dried coating;
   an alkali metal silicate binder in an amount effective to durably bind said burnable poison particles and said optional graphite particles within said coating;
   an optional rheology-enhancing component in an amount effective to promote application of said coating to said component; and
   a polar solvent in an amount effective to disperse said burnable poison particles, said optional graphite particles, said alkali metal silicate binder and said optional rheology-enhancing component.

2. The uncured burnable poison containing coating of claim 1, wherein said burnable poison particles are boron carbide particles having a naturally occurring distribution of boron-10 and boron-11.

3. The uncured burnable poison containing coating of claim 1, wherein said burnable poison particles are boron carbide particles which are enriched in boron-10.

4. The uncured burnable poison containing coating of claim 1, wherein said polar solvent is water.

5. The uncured burnable poison containing coating of claim 2, wherein said alkali metal silicate binder is potassium silicate.

6. The uncured burnable poison containing coating of claim 2, wherein said rheology-enhancing component is plate-like hectorite.

7. The uncured burnable poison containing coating of claim 2, wherein about 30 to about 50 parts of boron carbide are provided per 100 parts alkali metal silicate binder.

8. The uncured burnable poison containing coating of claim 2, wherein about 25 to about 50 parts of water are provided per 100 parts of alkali metal silicate binder.

TABLE 1
Metal Silicate Coatings Formulations

| ID #(Parts by Weight) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Deionized water | 28.8 | 28.8 | 32.4 | 35 | 29.8 | 31.9 | 36.7 | 68.4 | 34.7 | 39 | 40.4 | 39.7 |
| Whittaker Min-U-Gel 400 | 2 | 2 | 2 | 3.8 | — | — | — | — | — | — | — | — |
| Rheox Bentone MA | — | — | — | — | 3.7 | 1.7 | 1.7 | 3.4 | 1.9 | 2 | 0.5 | 0.5 |
| Cummings graphite M850 | 5.2 | 5.2 | 5.8 | 5.8 | 5.8 | 6.2 | — | — | 3 | 7.6 | 7.8 | — |
| Graphite Products LS-2306 | — | — | — | — | — | — | — | — | — | — | — | 7.4 |
| ART boron carbide | 36.1 | 36.1 | 40.5 | 36.1 | 36.1 | 36.1 | 43.2 | 86.4 | 39.7 | 45 | 45 | 44.6 |
| FMC Lithsil 4 | 100 | 100 | — | 100 | 100 | 100 | 100 | 100 | 100 | — | — | 100 |
| FMC Lithsil 6* | — | — | 100 | — | — | — | — | — | — | — | — | — |
| PQ Kasil #1 | — | — | — | — | — | — | — | — | — | 100 | 100 | — |
| Ammonia | — | 0.5 | — | 2 | — | — | 2 | 2 | — | — | — | — |
| Dispersion Method Waring Blender - Ultrasonic/Hand Stirred | ✓ | ✓ | ✓ | ✓ | ✓ | ✓ | ✓ | ✓ | ✓ | ✓ | ✓ | ✓ |

*As-received solution

9. The uncured burnable poison containing coating of claim 2, wherein about 434 to about 8 parts graphite are provided per each 100 parts of said alkali metal silicate binder.

10. The uncured burnable poison containing coating of claim 8, wherein about 0.5 to about 2 parts of rheology-enhancing component are provided per 100 parts of alkali metal silicate binder.

11. A coated nuclear fuel assembly component comprising:
   a zirconium alloy nuclear fuel assembly component; and
   a cured burnable poison containing coating disposed on said zirconium alloy nuclear fuel assembly component, said cured burnable poison containing coating further comprising:
   burnable poison particles in an amount effective to provide neutron absorption at a predetermined level;
   optional graphite particles in an amount effective to provide abrasion resistance to said coating; and
   an alkali metal silicate binder in an amount effective to durably bind said burnable poison particles and said graphite particles.

12. The coated nuclear reactor fuel assembly component of claim 11, wherein said burnable poison is selected from erbium oxide, gadolinium oxide, boron nitride, titanium boride, and zirconium diboride.

13. The coated nuclear reactor fuel assembly component of claim 11, wherein said burnable poison is boron carbide.

14. The coated nuclear reactor fuel assembly component of claim 13, wherein said boron carbide particles have diameters ranging from about 1 to about 10 microns.

15. The coated nuclear reactor fuel assembly component of claim 11, wherein said alkali metal silicate binder is potassium silicate.

16. The coated nuclear reactor fuel assembly component of claim 11, wherein said graphite particles have diameters ranging from about 1 to about 10 microns.

17. The coated nuclear reactor fuel assembly component of claim 11, wherein about 4 to about 8 parts graphite are provided per 100 parts alkali metal silicate binder.

18. The coated nuclear reactor fuel assembly component of claim 13, wherein about 30 to 50 parts boron carbide are provided per 100 parts alkali metal silicate binder.

19. The coated nuclear reactor fuel assembly component of claim 11, wherein said zirconium alloy nuclear fuel assembly component is a fuel element cladding tube.

20. The coated nuclear reactor fuel assembly component of claim 19, wherein said zirconium alloy is selected from Zircaloy-2 and Zircaloy-4.

21. The coated nuclear reactor fuel assembly component of claim 19, wherein said coating is about 0.0015 inches in thickness.

22. The coated nuclear reactor fuel assembly component of claim 19, wherein said coating comprises about 16 mg of boron carbide having a naturally occurring distribution of boron-10 and boron-11 per square inch and said cladding tube has an inside diameter of about 0.4 inches.

* * * * *